United States Patent
Sakai et al.

(10) Patent No.: US 7,368,152 B2
(45) Date of Patent: May 6, 2008

(54) ARTIFICIAL STONE WALL MATERIAL

(75) Inventors: Mieko Sakai, Tokyo (JP); Kenichiro Saito, Chiba (JP)

(73) Assignee: Availvs Corporation, Tokyo (JP)

( * ) Notice: Subject to any disclaimer, the term of this patent is extended or adjusted under 35 U.S.C. 154(b) by 98 days.

(21) Appl. No.: 10/518,287

(22) PCT Filed: Jun. 19, 2003

(86) PCT No.: PCT/JP03/07798

§ 371 (c)(1), (2), (4) Date: Nov. 22, 2005

(87) PCT Pub. No.: WO04/000752

PCT Pub. Date: Dec. 31, 2003

(65) Prior Publication Data

US 2006/0121247 A1    Jun. 8, 2006

(30) Foreign Application Priority Data

Jun. 19, 2002    (JP) .............................. 2002-179162

(51) Int. Cl.
*B32B 3/12* (2006.01)
*B32B 5/16* (2006.01)
*B32B 27/20* (2006.01)
*C04B 14/02* (2006.01)

(52) U.S. Cl. ........................... 428/15; 428/67; 428/147; 428/403; 428/407; 52/316; 252/301.36

(58) Field of Classification Search ................. 428/15, 428/67, 402, 403, 404, 406, 407, 145, 147, 428/149, 150, 6; 52/316, 311.1; 40/124.5, 40/800; 252/301.36
See application file for complete search history.

(56) References Cited

U.S. PATENT DOCUMENTS

| 6,136,226 | A | 10/2000 | Sakai |
| 6,146,548 | A * | 11/2000 | Sakai ..................... 252/301.36 |
| 6,309,562 | B1 * | 10/2001 | Sakai et al. ............. 252/301.36 |
| 6,627,315 | B2 | 9/2003 | Sakai |
| 2001/0028941 | A1 | 10/2001 | Sakai |

(Continued)

FOREIGN PATENT DOCUMENTS

EP    905102    3/1999

(Continued)

*Primary Examiner*—John J. Zimmerman
*Assistant Examiner*—Aaron Austin
(74) *Attorney, Agent, or Firm*—Wenderoth, Lind & Ponack, L.L.P.

(57) ABSTRACT

The invention of this application provides an artificial stone wall material comprising an inorganic fine particle component having a size range of 180 μm to 9.5 mm and an inorganic finer particle component having a size range of less than 180 μm and a resin component. The resin component containing 5 wt % or more of a transparent inorganic fine particle component as the inorganic particle component and a concavo-convex surface wherein a maximum height between concavity and convexity ranges 1 mm to 100 mm. Further, the transparent inorganic fine particle component, which is exposed on the concavo-convex surface, is studded with sparkling points which change based on irradiation and movement of natural light or artificial light. The artificial stone wall material provides a novel means for finishing a wall surface which permits easy design of a wall surface and projection of the effect of the design.

15 Claims, 1 Drawing Sheet

① flat surface

② relief 1 (design of stacked cut stone with 15mm of concavo-convex height)

③ relief 2 (design of small cut stone tile with 5mm of concavo-convex height)

U.S. PATENT DOCUMENTS

2002/0086122 A1  7/2002  Sakai
2003/0087074 A1* 5/2003  Yamanashi et al. ......... 428/212

FOREIGN PATENT DOCUMENTS

| | | |
|---|---|---|
| EP | 983977 | 3/2000 |
| JP | 4-7458 | 1/1992 |
| JP | 6-23773 | 2/1994 |
| JP | 8-267666 | 10/1996 |
| JP | 8-333148 | 12/1996 |
| JP | 11292595 A * | 10/1999 |

* cited by examiner

① flat surface

② relief 1 (design of stacked cut stone with 15mm of concavo-convex height)

③ relief 2 (design of small cut stone tile with 5mm of concavo-convex height)

ARTIFICIAL STONE WALL MATERIAL

FIELD OF THE INVENTION

The invention of this application relates to an artificial stone wall material, having extremely high design possibilities, having a natural feeling, and capable of providing brightness always changeable in relation to movement of and a change in intensity of natural light or artificial light. More particularly, the invention of this application relates to a novel artificial stone wall material, useful as a wall finishing material for use in architecture and civil engineering, and having high superiority in designing.

DESCRIPTION OF THE RELATED ART

Conventionally, coating with a paint, and application of tiles, bricks, glass, stones and other materials have been applied when finishing outer walls of buildings and houses. Such finishing materials are classified into two groups, glossy finish and matte finish, and are generally used alone or combination of two kinds or more in consideration of designing. A combined design of a glossy finish and matte finish is also adopted.

For example, in the coating, various kinds of glossy finish or matte finish have been achieved by contrivance in selection of raw materials or composite manner of those. In case of natural stone, a glossy surface thereof is achieved by polishing, or alternatively, a matte concavo-convex surface is finished by tapping, burner jet, hammering and the like.

In small scale constructions such as houses, it is difficult in keeping a balance with surroundings (environment) to use a finishing material, such as stone, with gloss like a planar polishing for entire outer wall surface. Therefore, such a glossy finishing material is hardly adopted by itself and the mainstream of designing tends to combine both finishing materials of gloss and matte.

A use of a combination of a glossy finish and matte finish, as a conventional adoption, has great trouble in terms of application, since such a use takes time and labor in preparing several finishing materials and has a great problem of difficulty in projection of a design effect on a wall surface.

Therefore, there is high latent need for a wall finishing material, with a so-called third superiority in designing, having both functions of gloss and matte by itself, that is different from a combination of a glossy material and matte material, and is easy to use when designing a wall surface to project an effect of the design without causing any problem in the prior art. It is accordingly an object of the invention of the application to provide a novel means for finishing a wall surface capable of satisfying such a need.

SUMMARY OF THE INVENTION

The invention of this application has been made in order to solve the problem described above. The first aspect thereof is directed to an artificial stone wall material comprising an inorganic fine particle component having a size in the range of 180 μm to 9.5 mm and an inorganic finer particle component having a size in the range of less than 180 μm and a resin component, containing 5 wt % or more of a transparent inorganic fine particle component as said inorganic fine particle component, having a concavo-convex surface wherein a maximum height between concavity and convexity ranges 1 mm to 100 mm, being molded and solidified into a shape of a plate or a deformed shape, and wherein both the transparent inorganic fine particle component, which is exposed on the surface thereof, and a shape of the concavo-convex surface are studded with sparkling points which change according to irradiation (radiation) and movement of natural light or artificial light.

The second aspect of the invention is directed to the artificial stone wall material described above, wherein the inorganic fine particle component includes particles of one or more of (i) particles obtained by crushing and screening natural stones such as granite and marble, molded products such as tile or (ii) particles obtained by screening sands such as river sand and sea sand. Further, the transparent inorganic fine particle component contained in content of 5 wt % or more in the inorganic fine particle component includes particles made of one or more of particles with achromatic transparency or chromatic transparency such as quartz stone, glass, garnet, amethyst and the like. The third aspect of the invention is directed to the artificial stone wall material, wherein at least part of the inorganic finer particle component is a luminescent material or a fluorescent material.

The fourth aspect of the invention is directed to the artificial stone wall material, wherein the luminescent material or the fluorescent material is sintered into a surface of the transparent inorganic fine particle component or covered thereon together with a resin.

The fifth aspect of the invention is directed to the artificial stone wall material according to any aspect described above, wherein at least part of the inorganic fine particle component includes particles having a size in the range of 180 μm to 9.5 mm, obtained by crushing an artificial stone manufactured by molding and solidifying a mixture of (i) an inorganic fine particle component having a size in the range of 180 μm to 9.5 mm, (ii) an inorganic finer particle component having a size in the range of less than 180 μm, and (iii) the resin component.

The sixth aspect of the invention is directed to the artificial stone wall, wherein the artificial stone crushed into particles having a size in the range of 180 μm to 9.5 mm includes a transparent inorganic fine particle component as the inorganic fine particle component.

The seventh aspect of the invention is directed to the artificial stone wall material, wherein the artificial stone crushed into particles having a size in the range of 180 μm to 9.5 mm includes a luminescent material or a fluorescent material as the inorganic fine particle component.

The eighth aspect of the invention of this application is directed to an artificial stone wall material, wherein the artificial stone wall material according to any aspect described above constitutes entirely the surface layer thereof.

The ninth aspect of the invention is directed to the artificial stone wall material according to any aspect described above, wherein the resin component in the surface portion thereof is removed by dissolution with a solvent or by pressured water from a water jet causing the transparent inorganic fine particle component to be exposed on the surface portion thereof.

The tenth aspect of the invention is directed to the artificial stone wall material, wherein the concavo-convex surface having a maximum height in the range of 1 mm to 100 mm is formed by a method of casting with a reverse decoration molding followed by hot pressing, hot extrusion or hot centrifugal molding.

The eleventh aspect of the invention is directed to the artificial stone wall material, wherein a metal fitting for attaching the wall material onto a wall surface is molded and embedded integrally at least in any of the rear surface or a lateral side of the molded material having a concavo-convex surface.

DETAILED DESCRIPTION OF THE INVENTION

Figure 1:
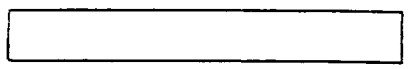
FIG. 1 illustrates sectional views showing three types of profiles of wall materials as examples.
Figure 1:
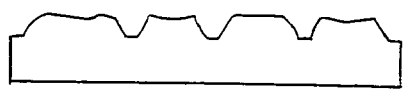
Figure 1:
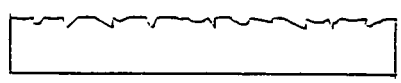

Description will be given of embodiments of the invention of this application, which has a feature as described above.

The invention of this application has an essential feature of the artificial stone wall material that provides, as described above, sparkling points which change based on irradiation (radiation) and movement of natural light or artificial light, namely with a change in intensity and incidence angle of those lights or the like. The feature originates from a composition thereof indispensably including:

<A-1> an inorganic fine particle component having a size in the range of 180 μm to 9.5 mm;

<A-2> an inorganic finer particle component having a size in the range of less than 180 μm; and <B> a resin component.

In addition, the <A-1> inorganic fine particle component contains 5 wt % or more of the transparent inorganic fine particle component.

Herein, the <A-1> inorganic fine particle component and the <A-2> inorganic finer particle component realize, as an inorganic aggregate constituting the artificial stone wall material, physical properties such as a desired degree of strength and a hardness by being mixed with the <B> resin component. In realization of such a physical property, it is important to combine the two groups of the <A-1> and <A-2> inorganic components different in size of particles. This is because by mixing the <A-1> and <A-2> inorganic components different in size of particles, there is realized the artificial stone wall material high in density as a result of the highest densification in screening filling property. Adjustment in mixing proportion of the <B> resin component achieves the artificial stone wall material having such a native stone-like or a natural appearance such that it is impossible to be recognized as a resin molded product at a glance.

A composition in this case preferably contains less than 93 wt % of the <A-1> and <A-2> inorganic components as a total and 7 wt % or more of the <B> resin component, for example on the order in the range of 7 to 70 wt %. Individual percentages of combinations of the <A-1> and <A-2> inorganic components are generally preferably as follows relative to 100% of a total amount as described below.

The <A-1> inorganic fine particle component is in the range of 20 to 80% and the <A-2> inorganic finer component is in the range of 80 to 20%.

While the <A-1> inorganic fine particle component at a content in the above range includes 5 wt % or more of the transparent inorganic particle component relative to the total of a weight of the <A-1> inorganic fine particle component, the total of the <A-1> inorganic fine particle component may be transparent and a content of the transparent inorganic particle component therein is generally in the range of 5 to 95 wt % and preferably in the range of 10 to 70 wt %.

There may be various kinds of the <A-1> and <A-2> inorganic components and examples thereof include natural stone particles, mineral particles, ceramic particles, glass particles, particles of a metal or a metal alloy, and others, which can be used alone or two or more kinds. The <A-1> inorganic fine particle component, one of the above <A-1> and <A-2> inorganic components, contains 5 wt % or more of the transparent inorganic fine particle component, in which examples of transparent inorganic fine particle components preferably include particles of quartz stone, glass, garnet, amethyst and others with achromatic transparency or chromatic transparency, which are preferably used alone or two or more kinds in mixture. The other inorganic fine particle component except for the transparent inorganic fine particle component is exemplified as particles obtained by crushing and screening natural stones such as granite and marble and molded products such as tile, and by screening sands such as river sand and sea sand. Advantageous points in the use of river sand, sea sand or dam sedimentation sand as a component in composition, are that such types of sand are of energy saving materials because no crushing occurs (i.e., such types of sand have rounded corners of particles leading to good fluidity in a mixture prior to solidification and such types of sand have a natural feeling to be revealed, etc.)

The other inorganic fine particle component may be a particle, on the surfaces of which a luminescent pigment or a fluorescent pigment is coated by means of sintering, or as having a coat layer in a mixture with a resin thereon. Such a coated particle can characteristically exert luminescence or fluorescence with a content of 5 wt % or more relative to the total weight thereof.

Such a luminescent pigment or a fluorescent pigment may be contained at least as part of the <A-2> inorganic finer particle component.

The <B> resin component, as a component of a composition of the artificial stone wall material of the invention of this application, may be one of various kinds of polymers and copolymers such as addition polymer or condensation polymer, and may be selected in consideration of a strength, weather resistance, water resistance, oil resistance and the like in connection with a particular application as a wall material. For examples of those, methacrylate resin, acrylate resin, polyester resin, epoxy resin or a composite resin including one or more kinds thereof may be generally preferable.

In the artificial stone wall material of the invention of this application, a recycled material from artificial stone may be used as at least one of the <A-1> and <A-2> fine particle components and the <B> resin component. Examples of the recycled material may include various kinds of materials such as a building material including a floor board or furniture wood, a civil engineering material used in a road or the like, a material manufactured for use in a disaster prevention or the like, and a material discharged in a manufacturing process thereof. The recycled material may include particles manufactured in a procedure in which an artificial stone obtained by molding and solidification of a mixture of an inorganic fine particle component having a size in the range of 180 μm to 9.5 mm and an inorganic finer particle component having a size in the range of less than 180 μm and a resin component is crushed and screened into particles having a size in the range of 180 μm to 9.5 mm. The recycled materials are used at least as part of the <A-1> inorganic fine particle component.

With such use of the recycled material, resource saving and cost saving are achieved.

In a case where a transparent inorganic fine particle component and a luminescent material or a fluorescent material are mixed into an artificial stone crushed so as to having a size in the range of 180 µm to 9.5 mm, a good light emitting performance can be expected.

Note that while it is defined as sizes of the inorganic particle components that the fine particle are in the range of 180 µm to 9.5 mm, and finer particles are in the range of less than 180 µm in the above description, for example, actually this classification can be carried out easily by sieves with the nominal openings described in JIS Z 8801-1:2000 corresponding to ISO. The fine particle component having a size in the range of 180 µm to 9.5 mm can be classified as a particle remaining by the sieve with a 180 µm opening and a particle passing through the sieve with a 9.5 mm opening. Besides the inorganic finer particle components being classified as particles having a size in the range of less than 180 µm the inorganic finer particles components can be classified as particles passing through the sieve with a 180 µm opening.

In the invention of this application, the artificial stone wall material as described above may constitute only a surface layer of a wall material for actual application. For example, the above artificial stone wall material may constitute only a surface layer of a molded product which is made from a mixture of a resin and a base material, such as cement-based inorganic material or an inorganic material made from a laminate product or made from an integrally molded product with other materials. With such a construction, an artificial stone wall material can be provided at a lower cost.

In the artificial stone wall material of the invention of this application, in addition to the feature of the compositions as described above, it is necessary that the artificial stone wall material has a concave-convex surface having a maximum height in the range of 1 mm to 100 mm in concavity and convexity and that at least part of the transparent inorganic fine particle component is exposed on the surface thereof. That the concavo-convex surface has a maximum height in the range of 1 mm to 100 mm in concavity and convexity is an indispensable requirement for being studded with sparkling points which change based on irradiation and movement of natural or artificial light. If the height of concavity and convexity on a surface is less than 1 mm, it is not sufficient for realizing such sparkling points. In case of exceeding 100 mm, a thickness of a wall finish material is excessively thick and will render a higher cost and enhance constraint on the application of the artificial stone wall material to buildings, moreover achieving such points is interfered to the contrary. On the other hand, it is indispensable to expose a transparent inorganic fine particle component. Such an exposure is realized by mixing a transparent component having a content of 5 wt % or more relative to a total amount of the <A-1> inorganic fine particle component. If the content is less than 5 wt %, exposure of the transparent inorganic fine particle component is not sufficient, which makes it difficult to expect for being studded with such sparkling points.

The artificial stone wall material of the invention accompanying concavity and convexity on the surface and exposure of a transparent inorganic fine particle component can be a product obtained by molding and solidification into a plate or a deformed shape. Means for the molding and solidification may be of various kinds. Preferable examples to be adopted for molding and solidification include a method of casting with a reverse decoration molding followed by hot pressing, hot extrusion or hot centrifugal molding.

The exposure of a transparent inorganic fine particle component is also realized effectively by removal of a resin component on the surface portion with a solvent capable of dissolving a resin component on the surface portion and by removal of a resin component on the surface portion by jetting pressured water from a water jet onto the surface portion.

With such means, the artificial stone wall material of the invention of this application makes it possible to be studded with sparkling points which change based on irradiation and movement of natural or artificial light. Such an artificial stone wall material has never been known thus far and unrestricted designing can be realized easily by a combination of a wall surface portion having a desired gloss with one having less gloss or with one having no gloss (matte).

A metal fitting for attaching the wall material onto a wall surface may also be embedded and molded integrally at least in any of the rear surface or lateral sides of the molded material having a concavo-convex surface.

In the artificial wall materials provided by the invention of this application, the features as described above are realized, for example, on the basis of physical properties as a wall material shown in Table 1.

TABLE 1

| | |
|---|---|
| bending strength | 270~300 N/cm |
| Vickers hardness | 950~1150 |
| water absorption coefficient | 0.05~0.2 |
| accelerated weather resistance S.W.O.M | no anomaly |
| SUV | no anomaly |
| acid/alkali resistance | no anomaly |
| freezing and thawing test B method over 200 cycles (JIS A 5422 "Fiber reinforced cement sidings") | no anomaly |
| impact resistance test 500 g . . . 2000 mm after falling weight (plate thickness of 18, 21 and 24 mm) | no anomaly |
| embedded metal fitting pull-up breaking load (mounting strength per each site) | 420~1060 kgf |

Then, examples are shown below and detailed description will be given of the invention of this application. It is natural that the invention is not intended to be limited by the following examples.

EXAMPLES

Example

Compositions in the next table were prepared. Herein, MMA indicates methylmethacrylate resin component and, as additive agents, a peroxide type curing catalyst and a light stabilizer were employed.

TABLE 2

| compositions | composition 1 | composition 2 | composition 3 | comparative composition |
|---|---|---|---|---|
| granite-based river sand inorganic fine particles | 30 w % | 54 w % | | 60 w % |
| andesite-based crushed stone inorganic fine particles | | | 30 w % | |
| transparent inorganic fine particles (quartz stone) | 30 w % | 6 w % | 30 w % | |
| inorganic finer particles (aluminum hydroxide) | 25 w % | 25 w % | 25 w % | 25 w % |
| MMA | 14 w % | 14 w % | 14 w % | 14 w % |
| additive agent and others | 1 w % | 1 w % | 1 w % | 1 w % |
| transparent inorganic fine particle ratio C/(A + B + C) % | 50 | 10 | 50 | 0 |

The above compositions were subjected to casting followed by hot pressing to thereby form wall materials, respectively. As the surface portions, selected were three types of profiles of wall materials shown in FIG. 1, that is (1) a flat surface, (2) a relief 1 (a design of stacked cut stone with a maximum height in concavity and convexity of 15 mm) and (3) a relief 2 (a design of small cut stone tile with a maximum height in concavity and convexity of 5 mm). In a case of the relief 1, concavity and convexity are formed with a molding die and in a case of the relief 2, a flat surface is molded and thereafter the surface is processed by a water jet, thereby forming a concave and convex surface.

Obtained artificial stone wall materials were visually sensory-evaluated by monitors on a feeling of the above-described sparkling changing points wherewith a wall surface is studded. The evaluation was performed at 8 a.m., at noon and at 4 p.m. in fine weather using 50 persons as monitors (the number of male persons equal to that of female persons with an even disbursement over the age ranges of 20 to 30; 31 to 40; 41 to 50; 51 to 60; and 61 to 70) and results were further subjected to on-average comprehensive evaluation.

The criteria of this evaluation are as follows:

A: such sparkling changing points as described above are excellent as wall surface appearance, B: such points are good as wall surface appearance, C: such points are weak, to the contrary, giving a strange feeling, and D: no such points were recognized.

Table 3 shows results of the evaluation.

TABLE 3

| | Compositions | | | | | | | | | | | |
|---|---|---|---|---|---|---|---|---|---|---|---|---|
| | composition 1 | | | composition 2 | | | composition 3 | | | comparative composition | | |
| surface profiles | ① | ② | ③ | ① | ② | ③ | ① | ② | ③ | ① | ② | ③ |
| comprehensive evaluation | B | A | A | C | B | A | C | A | A | D | D | D |

It was also confirmed from the results of Table 3 that the wall material of the invention of this application, which gave the comprehensive evaluation A or B observing a wall to be studded with sparkling changing points, provided a preferable superiority in designing, which has never been known conventionally.

INDUSTRIAL APPLICABILITY

As described in detail above, the invention of this application provides a novel means for finishing a wall surface which is not a conventional design in combination of a glossy finish and matte finish but essentially has both functions by itself and allows easy designing of a wall surface and projecting the effect of the design.

The invention claimed is:

1. An artificial stone wall material comprising:
   an inorganic fine particle component having a size range of 180 μm to 9.5 mm;
   an inorganic finer particle component having a size range of less than 180 μm; and
   a resin component,
   wherein:
   5wt % or more of the inorganic fine particle component is a transparent inorganic fine particle component;
   the inorganic fine particle component, the inorganic finer particle component, and the resin component form a concavo-convex surface having a maximum height between concavity and convexity ranging from 5 mm to 100 mm, by being molded and solidified into a shape of a plate or a deformed shape;
   at least a portion of the transparent inorganic fine particle component is exposed on the concavo-convex surface; and
   the exposed transparent inorganic fine particle component provides the concavo-convex surface with sparkling points which change based on a level of radiation and movement of natural light or artificial light.

2. The artificial stone wall material according to claim 1, wherein:
   the inorganic fine particle component, except for the transparent inorganic fine particle component, includes particles, of one or more kinds of particles obtained by (i) crushing and screening natural stones including granite and marble and a molded product including tile, or (ii) screening sands having rounded surfaces including river sand and sea sand; and
   the transparent inorganic fine particle component includes particles, of one or more kinds of particles, each particle having achromatic transparency or chromatic transparency, including quartz stone, glass, garnet, or amethyst.

3. The artificial stone wall material according to claim 1, wherein at least part of the inorganic finer particle component is a luminescent material or a fluorescent material.

4. The artificial stone wall material according to claim 3, wherein the luminescent material or the fluorescent material is (i) sintered into a surface of the transparent inorganic fine particle component, or (ii) covered onto the transparent inorganic fine particle component and the resin component.

5. The artificial stone wall material according to claim 1, wherein at least part of the inorganic fine particle component includes particles obtained by crushing an artificial stone which is manufactured by molding and solidifying a mixture of (i) the inorganic fine particle component having a size range of 180 μm to 9.5 mm, (ii) the inorganic finer particle component having a size range of less than 180 μm, and (iii) the resin component.

6. The artificial stone wall material according to claim 5, wherein the artificial stone crushed into particles includes the transparent inorganic fine particle component as the inorganic fine particle component.

7. The artificial stone wall material according to claim 5, wherein the artificial stone crushed into particles includes a luminescent material or a fluorescent material as the inorganic fine particle component.

8. The artificial stone wall material according to claim 1, wherein the resin component at a surface of the artificial stone wall material is removed by dissolution with a solvent or by pressured water from a water jet to expose the transparent inorganic fine particle component on a surface of the artificial stone wall material.

9. The artificial stone wall material according to claim 1, wherein the concavo-convex surface is formed by casting with a reverse decoration molding followed by hot pressing, hot extrusion or hot centrifugal molding.

10. The artificial stone wall material according to claim 1, wherein a metal fitting for attaching the artificial stone wall material onto a wall surface is molded and embedded integrally at least in a rear surface or a lateral side of the artificial stone wall material having the concavo-convex surface.

11. The artificial stone wall material according to claim 2, wherein at least part of the inorganic finer particle component is a luminescent material or a fluorescent material.

12. The artificial stone wall material according to claim 2, wherein at least part of the inorganic fine particle component includes particles obtained by crushing an artificial stone which is manufactured by molding and solidifying a mixture of (i) the inorganic fine particle component having a size range of 180 µm to 9.5 mm, (ii) the inorganic finer particle component having a size range of less than 180 µm, and (iii) the resin component.

13. The artificial stone wall material according to claim 3, wherein at least part of the inorganic fine particle component includes particles obtained by crushing an artificial stone which is manufactured by molding and solidifying a mixture of (i) the inorganic fine particle component having a size range of 180 µm to 9.5 mm, (ii) the inorganic finer particle component having a size range of less than 180 µm, and (iii) the resin component.

14. The artificial stone wall material according to claim 4, wherein at least part of the inorganic fine particle component includes particles obtained by crushing an artificial stone which is manufactured by molding and solidifying a mixture of (i) the inorganic fine particle component having a size range of 180 µm to 9.5 mm, (ii) the inorganic finer particle component having a size range of less than 180 µm, and (iii) the resin component.

15. The artificial stone wall material according to claim 6, wherein the artificial stone crushed into particles includes a luminescent material or a fluorescent material as the inorganic fine particle component.

* * * * *